United States Patent
Sundaresan et al.

(10) Patent No.: US 6,385,629 B1
(45) Date of Patent: May 7, 2002

(54) SYSTEM AND METHOD FOR THE AUTOMATIC MINING OF ACRONYM-EXPANSION PAIRS PATTERNS AND FORMATION RULES

(75) Inventors: Neelakantan Sundaresan; Jeonghee Yi, both of San Jose, CA (US)

(73) Assignee: International Business Machine Corporation, Armonk, NY (US)

( * ) Notice: Subject to any disclaimer, the term of this patent is extended or adjusted under 35 U.S.C. 154(b) by 0 days.

(21) Appl. No.: 09/440,625

(22) Filed: Nov. 15, 1999

(51) Int. Cl.$^7$ .......................... G06F 15/00; G06F 17/30
(52) U.S. Cl. .......................................... 707/512; 707/6
(58) Field of Search .................. 707/1–7, 101–104, 707/203, 500–510, 526, 517, 515–516; 709/201–204, 217; 345/594, 650, 700

(56) References Cited

U.S. PATENT DOCUMENTS

| | | | |
|---|---|---|---|
| 5,745,360 A | | 4/1998 | Leone et al. |
| 5,819,260 A | * | 10/1998 | Lu et al. .......................... 707/3 |
| 5,857,179 A | | 1/1999 | Vaithyanathan et al. ....... 707/2 |

OTHER PUBLICATIONS

R. Larson, "Bibliometrics of the World Wide Web: An Exploratory Analysis of the Intellectual Structure of Cyberspace," the Proceedings of the 1966 American Society for Information Science Annual Meeting, also published as a technical report, School of Information Management and Systems, University of California, Berkeley, 1996, which is published on the Word Wide Web at URL; http://sherlock.sims.berkeley.edu/docs/asis96/asis96.html.

D. Gibson et al., "Inferring Web Communities from Link Topology," Proceedings of the 9$^{th}$ ACM. Conference on Hypertext and Hypermedia, Pittsburgh, PA, 1998.

D. Turnbull, "Bibliometrics and the World Wide Web," Technical Report University of Toronto, 1996.

K. McCain, "Mapping Authors in Intellectual Space: A technical Overview," Journal of the American Society for Information Science, 41(6):433–443, 1990.

S. Brin, "Extracting Patterns and Relations from the World Wide Web," WebDB, Valencia, Spain, 1998.

R. Agrawal et al., "Fast Algorithms for Mining Association Rules," Proc. of the 20th Int'l Conference on VLDB, Santiago, Chile, Sep. 1994.

(List continued on next page.)

Primary Examiner—Kim Vu
Assistant Examiner—Alford W. Kindred
(74) Attorney, Agent, or Firm—Samuel A. Kassatly (57) ABSTRACT

A computer program product is provided as an automatic mining system to identify a set of related information on the World Wide Web using the duality concept. The mining system addresses iteratively refines mutually dependent approximations to their identifications. Specifically, the mining system iteratively refines (i) pairs of phrases related in a specific way; (ii) the patterns of their occurrences in web pages; and (iii) the formation rules. In one embodiment, the automatic mining system identifies (acronym, expansion) pairs in terms of the patterns of their occurrences in the web pages and their formation rules. The automatic mining system includes a formation rule identifier that derives the formation rules, an acronym-expansion pair identifier that derives the (acronym, expansion) pairs, and a pattern identifier that derives the patterns. The database stores the (acronym, expansion) pairs, patterns, and formation rules. Initially, the database begins with small seed sets of (acronym, expansion) pairs, patterns, and formation rules that are continuously and iteratively broadened by the automatic mining system.

18 Claims, 3 Drawing Sheets

OTHER PUBLICATIONS

R. Agrawal et al., Mining Association Rules Between Sets of Items in Large Databases, Proceedings of ACM SIGMOD Conference on Management of Data, pp. 207–216, Washington, D.C., May 1993.

S. Chakrabarti et al. "Focused Crawling: A New Approach to Topic–Specific Web Resource Discovery," Proc. of The $8^{th}$ International World Wide Web Conference, Toronto, Canada, May 1999.

B. Huberman et al., "Strong Regularities in Word Wide Web Surfing," Xerox Palo Alto Research Center.

A. Hutchunson, "Metrics on Terms and Clauses," Department of Computer Science, King's College London.

J. Kleinberg, "Authoritative Sources in a Hyperlinked Environment," Proc. of 9th ACM–SIAM Symposium on Discrete Algorithms, May 1997.

R. Srikant et al., "Mining Generalized Association Rules," Proceedings of the $21^{st}$ VLDB Conference, Zurich, Swizerland, 1995.

W. Li et al., "Facilitating comlex Web queries through visual user interfaces and query relaxation," published on the Word Wide Web at URL: http://www.7scu.edu.au/programme/fullpapers/1936/com1936.htm as of Aug. 16, 1999.

G. Piatetsky–Shapiro, "Discovery, Analysis, and Presentation of Strong Rules," pp. 229–248.

R. Miller et al., "SPHINX: A Framework for Creating Personal, Site–specific Web Crawlers," published on the Word Wide Web at URL: http://www.7scu.edu.au/programme/fullpapers/1875/com1875.htm as of Aug. 16, 1999.

S. Soderland, "Learning to Extract Text–based Information from the World Wide Web, " American Association for Artificial Intelligence (www.aaai.org), pp. 251–254.

G. Plotkin. "A Note Inductive Generalization," pp. 153–163.

R. Feldman et al., "Mining Associations in Text in the Presence of Background Knowledge," Proceedings of the Second International Conference on Knowledge Discovery and Data Mining, Aug. 2–4, 1996, Portland, Oregon.

R. Kumar et al., "Trawling the Web for Emerging Cyber –Communities," published on the Word Wide Web at URL: http://www8.org/w8–papers/4a–search–mining/trawling/trawling.html as of Nov. 13, 1999.

"Acronym Finder", published on the Word Wide Web at URL:http://acronymfinder.com/ as of Sep. 4, 1999.

* cited by examiner

FIG. 2

SYSTEM AND METHOD FOR THE AUTOMATIC MINING OF ACRONYM-EXPANSION PAIRS PATTERNS AND FORMATION RULES

CROSS-REFERENCE TO RELATED APPLICATIONS

This application is related to patent application Ser. No. 09/439,379, titled "System and Method for Automatic Mining of Patterns and Relations," filed on Nov. 15, 1999, to patent application Ser. No. 09/440,203, titled "System and Method for Automatic Construction of Generalization—Specialization Hierarchy of Terms," filed on Nov. 15, 1999, to patent application Ser. No. 09/440,602, titled "System and Method for Automatic Recognition of Relevant Terms by Mining Link Annotations," filed on Nov. 15, 1999, to patent application Ser. No. 09/439,758, titled "System and Method for Automatic Discovery of Relevant Terms from the World Wide Web," Nov. 15, 1999, and to patent application Ser. No. 09/440,626, titled "System and Method for Automatic Mining of New Relationships," filed on Nov. 15, 1999, all of which are filed by the same assignee as this application on even date herewith, and are incorporated herein by reference in their entirety.

FIELD OF THE INVENTION

The present invention relates to the field of data mining, and particularly to a software system and associated method for identifying a set of related information on the World Wide Web. More specifically, the present invention relates to the automatic and iterative mining of acronyms and their expansions through patterns of occurrences and formation rules using a duality concept.

BACKGROUND OF THE INVENTION

The World Wide Web (WWW) is a vast and open communications network where computer users can access available data, digitally encoded documents, books, pictures, and sounds. With the explosive growth and diversity of WWW authors, published information is oftentimes unstructured and widely scattered. Although search engines play an important role in furnishing desired information to the end users, the organization of the information lacks structure and consistency. Web spiders crawl web pages and index them to serve the search, engines. As the web spiders visit web pages, they could look for, and learn pieces of information that would otherwise remain undetected.

Current search engines are designed to identify pages with specific phrases and offer limited search capabilities. For example, search engines cannot search for phrases that relate in a particular way, such as books and authors. Bibliometrics involves the study of the world of authorship and citations. It measures the co-citation strength, which is a measure of the similarity between two technical papers on the basis of their common citations. Statistical techniques are used to compute this measures. In typical bibliometric situations the citations and authorship are explicit and do not need to be mined. One of the limitations of the bibliometrics is that it cannot be used to extract buried information in the text.

Exemplary bibliometric studies are reported in: R. Larson, "Bibliometrics of the World Wide Web: An Exploratory Analysis of the Intellectual Structure of Cyberspace," Technical report, School of Information Management and Systems, University of California, Berkeley, 1996. http://sherlock.sims.berkeley.edu/docs/asis96/asis96.html; K. McCain, "Mapping Authors in Intellectual Space: A technical Overview," Journal of the American Society for Information Science, 41(6):433–443, 1990. A Dual Iterative Pattern Relation Expansion (DIPRE) method that addresses the problem of extracting (author, book) relationships from the web is described in S. Brin, "Extracting Patterns and Relations from the World Wide Web," WebDB, Valencia, Spain, 1998.

Another area to identify a set of related information on the World Wide Web is the Hyperlink-Induced Topic Search (HITS). HITS is a system that identifies authoritative web pages on the basis of the link structure of web pages. It iteratively identifies good hubs, that is pages that point to good authorities, and good authorities, that is pages pointed to by good hub pages. This technique has been extended to identify communities on the web, and to target a web crawler. One of HITS' limitations resides in the link topology of the pattern space, where the hubs and the authorities are of the same kind. i.e., they are all web pages. HITS is not defined in the text of web pages in the form of phrases containing relations in specific patterns.

Exemplary HITS studies are reported in: D. Gibson et al., "Inferring Web Communities from Link Topology," HyperText, pages 225–234, Pittsburgh, Pa., 1998; J. Kleinberg, "Authoritative Sources in a Hyperlinked Environment," Proc. of 9th ACM-SIAM Symposium on Discrete Algorithms, May 1997; R. Kumar, "Trawling the Web for Emerging Cyber-Communities," published on the WWW at URL: http://www8.org/w8-papers/4a-search-mining/trawling/trawling.html) as of Nov. 13, 1999; and S. Chakrabarti et al. "Focused Crawling: A New Approach to Topic-Specific Web Resource Discovery," Proc. of The $8^{th}$ International World Wide Web Conference, Toronto, Canada, May 1999.

The problem of information organization and lack of structure and consistency is further exasperated in technical and other fields that are acronym driven. The diversity and non-uniformity in the use of acronyms would oftentimes obscure the understanding of the subject matter being described, unless clear expansions are provided to the readers.

There is therefore a great and still unsatisfied need for a software system and associated method for automatically identifying and mining acronym-expansion pairs on the World Wide Web, using the duality concept and strict formation rules for quality. enhancement.

SUMMARY OF THE INVENTION

In accordance with the present invention, a computer program product is provided as an automatic mining system to identify a set of related information on the WWW using a duality concept. Duality problems, arise, for example, when a user attempts to identify a pair of related phrases such as (book, author); (name, email); (acronym, expansion); or similar other relations. The mining system addresses the duality problems by iteratively refining mutually dependent approximations to their identifications. Specifically, the mining system iteratively refines (i) pairs of phrases related in a specific way; (ii) the patterns: of their occurrences in web pages, i.e., the ways in which the related phrases are marked in the web pages; and (iii) the formation rules.

In one embodiment, the automatic mining system addresses a particular paradigmatic duality problem, namely identifying (acronym, expansion) pairs in terms of the patterns of their occurrences in the web pages. The solution to this problem involves two mutually dependent duality problems: The first being the duality between the related pairs and their patterns, and the second being the duality between the related pairs and the acronym formation rules. The automatic mining system runs in an iterative fashion for continuously and incrementally refining the sets of (acronym, expansion) pairs, patterns, and formation rules.

The automatic mining system is generally comprised of a database and three identifiers: a formation rule identifier, an acronym-expansion pair identifier, and a pattern identifier. The database contains the (acronym, expansion) pairs $R_{i-1}$ that have already been identified by the acronym-expansion pair identifier; the patterns $P_{i-1}$ that have already been identified by the pattern identifier; and the sets of formation rules that have already been identified by the formation rule identifier. Initially, the database begins with small seed sets of (acronym, expansion) pairs $R_0$, patterns $P_0$, and formation rules $E_0$, that are continuously and iteratively broadened by the automatic mining system.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items.

DETAILED DESCRIPTION OF THE INVENTION

The following definitions and explanations provide background information pertaining to the technical field of the present invention, and are intended to facilitate the understanding of the present invention without limiting its scope:

Acronym: An identifier formed by combining some of the letters of a phrase and used as an abbreviation.

Crawler or spider: A program that automatically explores the World Wide Web by retrieving a document and recursively retrieving some or all the documents that are linked to it.

Expansion: A phrase resulting from the expansion of an acronym.

Gateway: A standard interface that specifies how a web server launches and interacts with external programs (such as a database search engine) in response to requests from clients.

Internet: A collection of interconnected public and private computer networks that are linked together with routers by a set of standards protocols to form a global, distributed network.

Server: A software program or a computer that responds to requests from a web browser by returning ("serving") web documents.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/html", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client—server hypertext distributed information retrieval system.

Figure 1:
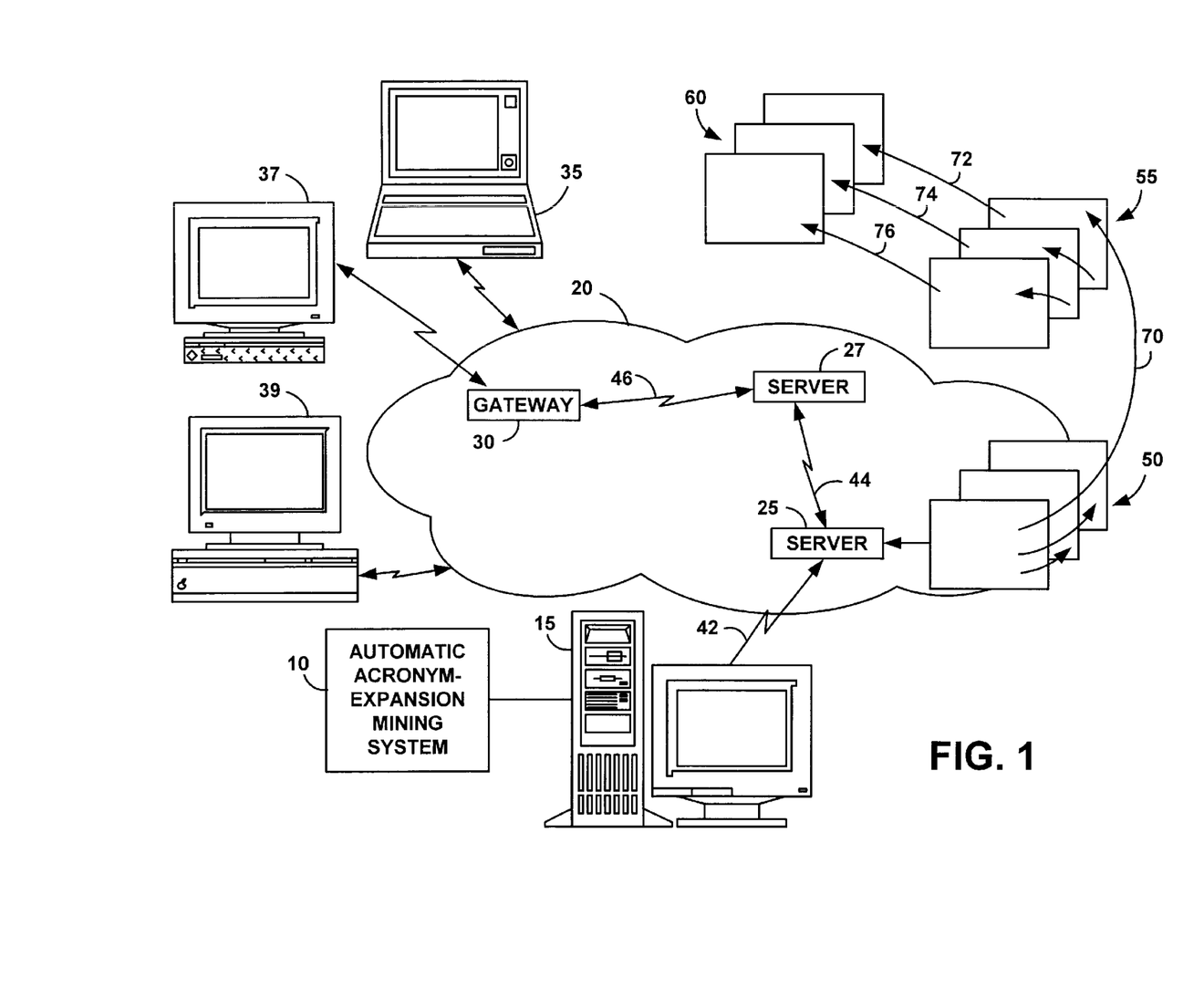
FIG. 1 is a schematic illustration of an exemplary operating environment in which the automatic acronym-expansion mining system of the present invention is used.

FIG. 1 portrays the overall environment in which the automatic mining system 10 according to the present invention can be used. The automatic mining system 10 includes a software or computer program product which is typically embedded within, or installed on a host server 15. Alternatively, the automatic mining system 10 can be saved on a suitable storage medium such as a diskette, a CD, a hard drive, or like devices. The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote internet users are represented by a variety of computers such as computers 35, 37, 39, and can query the automatic mining system 10 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, 60. The hypertext documents 50, 55, 60 most likely include embedded hypertext links to other locally stored pages, and hypertext links 70, 72, 74, 76 to other webs sites or documents 55, 60 that are stored by various web servers such as the server 27.

The automatic mining system 10 will now be described in more detail with further reference to FIG. 2. The automatic mining system 10 includes a database 80 and a computer program product such as a software package, which is generally comprised of and three identifiers (also referred to as routines or modules): a formation rule identifier 100, an acronym-expansion pair identifier 105, and a pattern identifier 110. In an alternative embodiment, the database 80 does not form part of the automatic mining system 10.

The database 80 contains the (acronym, expansion) pairs $R_{i-1}$ that have already been identified by the acronym-expansion pair identifier 105; the patterns $P_{i-1}$ that have already been identified by the pattern identifier 110; and the sets of formation rules $E_{i-1}$ that have already been identified by the formation rule identifier 100. Initially, the database 80 begins with small seed sets of (acronym, expansion) pairs $R_0$, patterns $P_0$, and formation rules $E_0$, that are continuously and iteratively broadened by the automatic mining system 10, as it will be explained in greater detail.

In one embodiment, a crawler that resides in the host server 15, visits and downloads every page on the WWW at periodic intervals, for example about once a month. During a visit to a web page or document $d_i$, the crawler downloads the document content to the host server 15. The host server 15 forwards the document $d_i$ to the automatic mining system 10, which, in turn, scans the document $d_i$ for potential (acronym, expansion) pairs.

Using the (acronym, expansion) pairs $R_{i-1}$ that have been previously identified by the acronym-expansion pair identifier 105 and stored in the database 80, the formation rule identifier 100 derives the formation rule $E_i$ for the potential patterns $P_i$. The acronym-expansion pair identifier 105 uses the document $d_i$ and the patterns $P_{i-1}$ that have been previously identified by the pattern identifier 110 and stored in the database 80, to derive the (acronym, expansion) pairs $R_i$. The pattern identifier 110 uses the document $d_i$, the derived formation rule $E_i$ and (acronym, expansion) pairs $R_i$, and the sets of patterns $P_{i-1}$ that have been previously identified by the pattern identifier 110 and stored in the database 80, to derive the pattern $P_i$. The derived formation rule $E_i$, (acronym, expansion) pair $R_i$, and pattern $P_i$ are, in turn, stored in the database 80 for use to recognize additional pattern $P_{i+1}$, (acronym, expansion) pairs $R_{i+1}$, and sets of formation rules $E_{i+1}$.

The operation of the automatic mining system 10 will now be described with further reference to FIG. 3 and the following Table 1.

As used herein, an (acronym, expansion) pair $R_{i-1}$ is comprised of the acronym and its expansion. For example, in Table 1 above, the first entry $r_0$ is the initial seed (acronym, expansion) pair which is comprised of the acronym "DCD" and its expansion "Data Carrier Detect". The (acronym, expansion) pair $r_0$ is represented as follows: (DCD, Data Carrier Detect).

An acronym-expansion Pattern $P_{i-1}$ defines a format in which an acronym and its expansion occur in a text such as document $d_i$. For example, in Table 1 above, the first entry $p_0$ is the initial seed acronym-expansion pattern expressed in the following format: Acronym (Expansion), as follows: DCD (Data Carrier Detect). The pattern is a tuple that can be expressed in full as follows: (acronym_prefix, acronym_suffix, expansion_prefix, formation_rule, expansion_suffix), where the acronym_prefix and the acronym_suffix are surrounding characters of the acronym, and the expansion_prefix and the expansion_suffix are surrounding characters of the expansion. As an example, the full pattern $p_0$ in Table 1, above, for the (expansion, acronym) pair (DCD, Data Carrier Detect) can be expressed as: (" ", " ", "(",<(1,1,*,*), " ", (1,1,*,*), " ", (1,1,*,*)>, ")").

The pattern $P_{i-1}$ includes a set of individual patterns $p_n$ and can be expressed as follows:

$$P_{i-1}=P_{i-2}+P'_{i-1},$$

where $P'_{i-1}$ is the set of patterns that were recently identified by the pattern identifier 110, during the $(i-1)^{th}$ iteration.

An acronym-expansion formation rule $E_{i-1}$ defines how an acronym is formed from its expansion phrase. As an example, with reference to the first (acronym, expansion) pair $r_0$ "DCD (Data Carrier Detect)" in Table 1, the acronym DCD includes the first letters of each word in its expansion "Data Carrier Detect" (which is the formation rule), and the expansion appears in parentheses following its acronym (which is the pattern).

The formation rule $E_{i-1}$ includes a set of individual formation rules en and can be expressed as follows:

$$E_{i-1}=E_{i-2}+E'_{i-1},$$

where $E'_{i-1}$ is the set of formation rules that were recently identified by the formation rule identifier 100, during the $(i-1)^{th}$ iteration. In turn, each individual formation rule $e_{i-1}$

TABLE 1

SAMPLE DATABASE ENTRIES

| $R_{i-1}$: {Pair:Acronym, Expansion} | $P_{i-1}$: {Pattern} | $E_{i-1}$: {Formation Rule} |
|---|---|---|
| DCD, Data Carrier Detect | DCD (Data Carrier Detect) | <(1, 1, *, *), " ", (1, 1, *, *), " ", (1, 1, *, *)> |
| DCD, Defense Communications Division | (DCD) Defense Communications Division | <(1, 1, *, *), " ", (1, 1, *, *), " ", (1, 1, *, *)> |
| DCD, Defense Corporate Database | Defense Corporate Database (DCD) | <(1, 1, *, *), " ", (1, 1, *, *), " ", (1, 1, *, *)> |
| DCD, Design Change Document | DCD [Design Change Document] | <(1, 1, *, *), " ", (1, 1, *, *), " ", (1, 1, *, *)> |
| DCD, Design Control Drawing | [DCD] Design Control Drawing | <(1, 1, *, *), " ", (1, 1, *, *), " ", (1, 1, *, *)> |
| DCD, Desired Completion Date | Desired Completion Date [DCD] | <(1, 1, *, *), " ", (1, 1, *, *), " ", (1, 1, *, *)> |
| DCD, DFAS Corporate Database | DCD - DFAS Corporate Database | <(1, 1, *, *), " ", (1, 1, *, *), " ", (1, 1, *, *)> |
| DCD, Digital Clock Distributor | DCD, Digital Clock Distributor | <(1, 1, *, *), " ", (1, 1, *, *), " ", (1, 1, *, *)> |
| DCD, Demand for Coordinates and Documents | Demand for Coordinates and Documents - DCD | <(1, 1, *, *), "for", (1, 1, *, *), "and", (1, 1, *, *)> |
| XML, Extensible Markup Language | XML (Extensible Markup Language) | <(1, 2, Ex, X), " ", (1, 1, *, *), " ", (1, 1, *, *)> | includes a sequence of replacement rules that are interspersed with intermediates.

An intermediate includes a string of characters between words in an expansion that are not a part of the acronym. A replacement rule is a tuple (substring_beginPosition, substring_endPosition, replacee, replacer). The substring_beginPosition is the position of the leading character of an expansion word to be placed in the acronym. The substring_endPosition is the position of the ending character of an expansion word to be placed in the acronym. The replacee is a substring to be replaced by another substring (the replacer), if any, in the acronym. If no replacement is required, the replacee and the replacer are both represented by an asterix "*".

As an example, in the initial seed formation rule $e_0$ in Table 1, the first replacement rule for the expansion term "Data" for the (acronym, expansion) pair (DCD, Data Carrier Detect) is (1,1,*,*). This first replacement rule indicates that the substring_beginPosition, which corresponds to "D" in the expansion term "Data" is the first character or "1". The first replacement rule also indicates that the substring_endPosition, which also corresponds to "D" in the expansion term "Data" is the first character or "1". In this replacement rule, the character "D" in the expansion term "Data" is the replacee, and corresponds to the acronym character "D" or the replacer. As a result, no replacement is required, wherefore the inclusion of the asterix "*" for each of the replacee and the replacer. The quotes " " following the first replacement rule indicate the absence of intermediates between the first and second replacement rules.

The second replacement rule for the expansion term "Carrier" for the (acronym, expansion) pair (DCD, Data Carrier Detect) is (1,1,*,*). This second replacement rule indicates that the substring_beginPosition, which corresponds to "C" in the expansion term "Carrier" is the first character or "1". The second replacement rule also indicates that the substring_endPosition, which also corresponds to "C" in the expansion term "Carrier" is the first character or "1". In this replacement rule, the character "C" in the expansion term "Carrier" is the replacee, and corresponds to the acronym character "C" or the replacer. As a result, no replacement is required, wherefore the inclusion of the asterix "*" for each of the replacee and the replacer. The quotes " " following the second replacement rule indicate the absence of any intermediate between the second and third replacement rules.

The third replacement rule for the expansion term "Detect" for the (acronym, expansion) pair (DCD, Data Carrier Detect) is (1,1,*,*). This third replacement rule indicates that the substring_beginPosition, which corresponds to "D" in the expansion term "Detect" is the first character or "1". The third replacement rule also indicates that the substring_endposition, which also corresponds to "D" in the expansion term "Detect" is the first character or "1". In this replacement rule, the character "D" in the expansion term "Detect" is the replacee, and corresponds to the acronym character "D" or the replacer. As a result, no replacement is required, wherefore the inclusion of the asterix "*" for each of the replacee and the replacer.

It therefore follows that the formation rule $e_0$ for the (acronym, expansion) pair (DCD, Data Carrier Detect), which includes the sequence of replacement rules and the intermediates, can be expressed as follows:

<(1,1,*,*)," ",(1,1,*,*)," ",(1,1,*,*)>

Further explanation of the formation rules $E_{i-1}$ can be better illustrated by way of two additional examples: The first example being the formation rule $e_8$ associated with the (acronym, expansion) pair (DCD, Demand for Coordinates and Documents), and the second example being the formation rule $e_9$ associated with the (acronym, expansion) pair (XML, Extensible Markup Language).

The first example illustrates the use of intermediates. In this formation rule $e_8$, two intermediates or intermediate terms are used. The first intermediate is the term "for" which is included between the first and second replacement rules, and the second intermediate is the term "and" which is included between the second and third replacement rules.

In the second example, the formation rule $e_9$ is comprised of a sequence of three replacement rules and no intermediates. The second replacement rule reads as follows: (1,2,Ex, X), and indicates that the substring_beginPosition, which corresponds to "Ex" in the expansion term "Extensible" is the first character or "1". This replacement rule also indicates that the substring_endPosition, which also corresponds to "x" in the expansion term "Extensible" is the second character or "2". In this replacement rule, the characters "Ex" in the expansion term "Extensible" are the replacees, and correspond to the acronym character "X" or the replacer. No intermediates are used in this formation rule $e_9$.

Figures 3, 4:
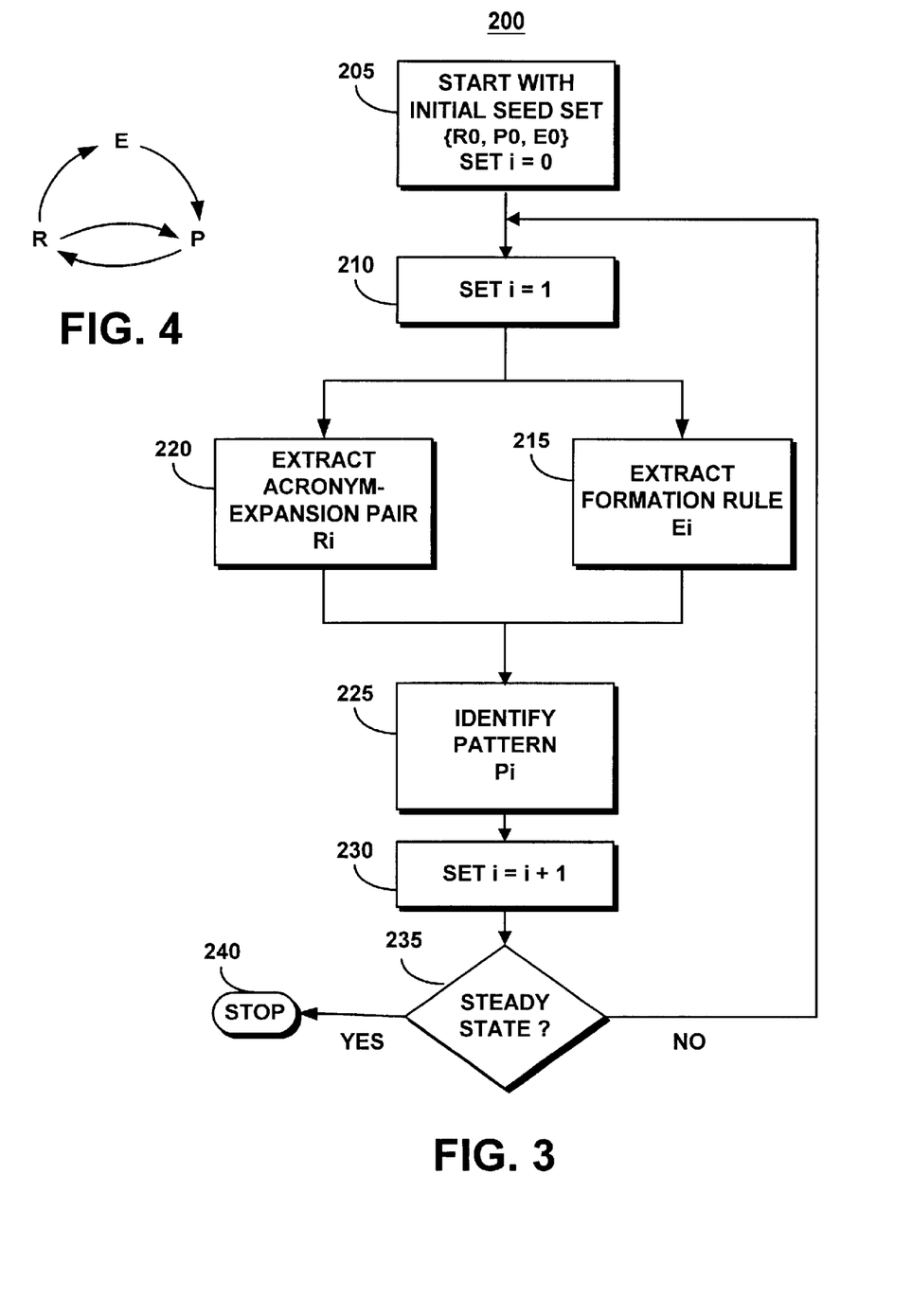
FIG. 3 is a high level flow chart that illustrates the operation of a preferred embodiment of the automatic acronym-expansion mining system of FIG. 2.
FIG. 4 is a diagram that illustrates the two duality relationships used by the automatic acronym-expansion mining system of FIG. 1.

The operation of the automatic mining system 10 is represented by a process 200 in FIG. 3. The process 200 starts at block or step 205 with a small seed set of (acronym, expansion) pair $r_0$, pattern $p_0$, and formation rule $e_0$, that are shown in the first row of Table 1. The cumulative (acronym, expansion) pair $R_0$, pattern $P_0$, and formation rule $E_0$ can be expressed as follows:

$$R_0=\{r_0\}$$

$$P_0=\{p_0\}$$

$$E_0=\{e_0\}$$

The process 200 then sets i=1 at block or step 210, and accepts the document $d_1$ (FIG. 2) that includes the (acronym, expansion) pair: (DCD, Defense Communications Division). The acronym-expansion pair identifier 105 (FIG. 2), knowing the previously stored pattern $p_0$: DCD (Data Carrier Detect), attempts to match the pattern $p_0$ to a new document $d_1$ at block 220, in order to find new (acronym, expansion) pairs by finding all instances of (acronym, expansion) pairs that satisfy the known patterns (e.g. pattern $p_0$). In this example, the acronym-expansion pair identifier 105 learns the new (acronym, expansion) pair $r_1$: (DCD, Defense Communications Division) by matching the pattern $p_0$: (" ", " ", "(",<(1,1,*,*)," ", (1,1,*,*), " ",(1,1,*,*)>, ")") to the (acronym, expansion) pair $r_1$. Since a match exists; the acronym-expansion pair identifier 105 learns the new (acronym, expansion) pair $r_1$. The acronym-expansion pair identifier 105 having identified the new (acronym, expansion) pair $r_1$, the pattern identifier 110 will now be able to identify a new pattern $p_1$.

Concurrently with, or, alternatively sequentially with the extraction of the (acronym, expansion) pair at block or step 220, the formation rule identifier 100 (FIG. 2) knowing the previously saved (acronym, expansion) pair $r_0$: (DCD, Data Carrier Detect), compares each of the three (acronym, expansion terms: (D, Defense), (C, Communications), and (D, Division) in the (acronym, expansion) pair $r_1$: (DCD, Defense Communications Division) to identify a new formation rule $e_0$. In this example, the formation rule $e_1$ identified from the (acronym, expansion) pair $r_1$ corresponds to the formation rule $e_0$ so that the cumulative formation rule becomes: $E_1=\{e_0\}$.

Knowing the (acronym, expansion) pair $r_1$, the formation rule $e_1$, and the previously stored pattern $P_{i-1}$, the pattern identifier 110 (FIG. 2) identifies the pattern $p_1$ by matching the (acronym, expansion) pair $r_1$ and the formation rule $e_1$ to document $d_1$ in order to look for pattern occurrences, in order to identify new patterns. The pattern $p_i$_(acronym_prefix, acronym_suffix, expansion_prefix, formation_rule, expansion_suffix), corresponds to one of the previously known (acronym, expansion) pairs $R_{i-1}$ and patterns $P_{i-1}$, and satisfies one of the formation rules $E_i$. This pattern identification step is illustrated in FIG. 3 by block or step 225.

Figure 2:
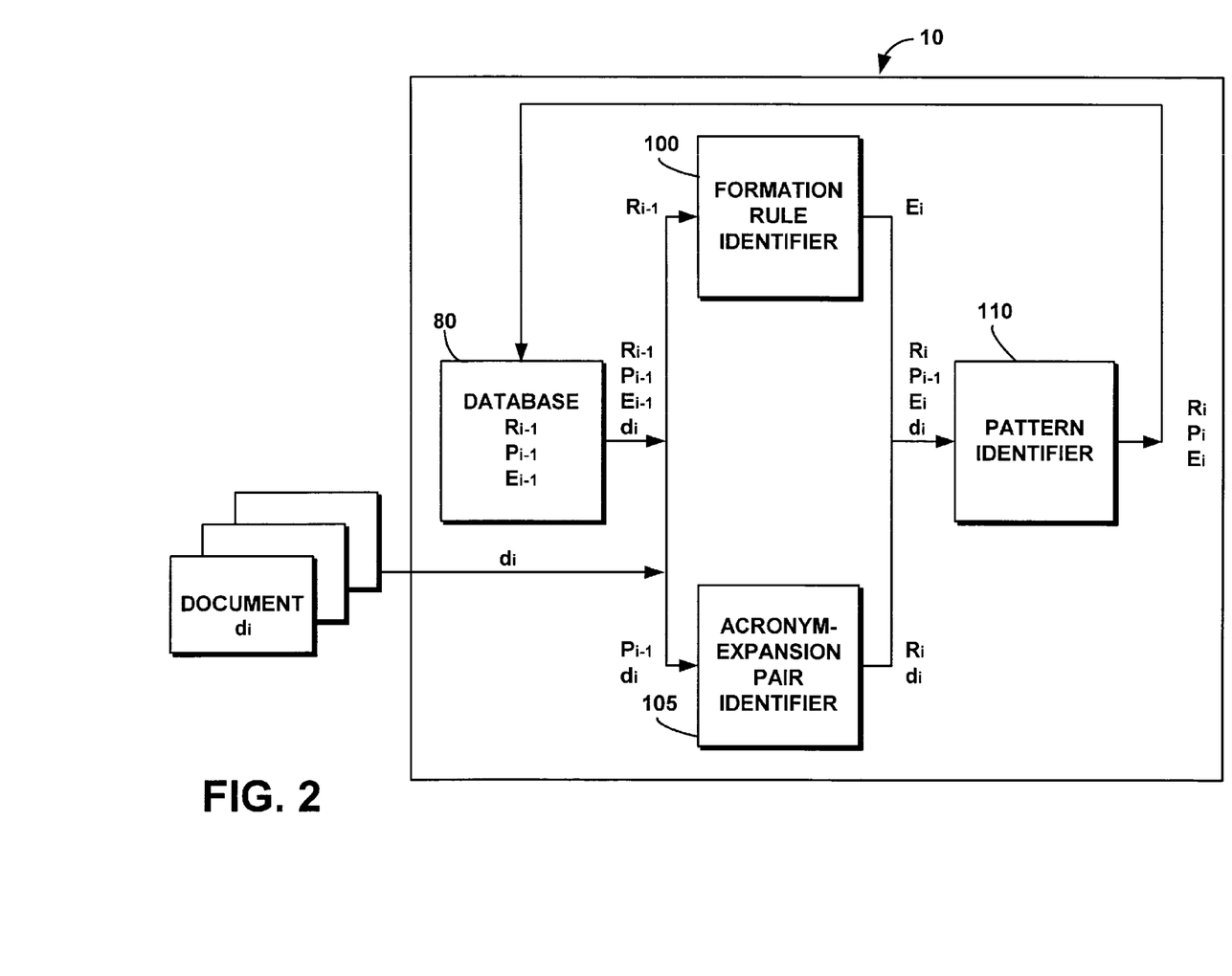
FIG. 2 is a block diagram of the automatic acronym-expansion mining system of FIG. 1.

The diagram in FIG. 4 illustrates the two duality relationships used by the automatic acronym-expansion mining system 10 of FIGS. 1 and 2. The first duality is established between the (acronym, expansion) pair R and the pattern P, while the second duality is established between the ((acronym, expansion) pair R, the formation rule E), and the pattern P. As a result of this cyclic duality, the accuracy of learning is accurate because the formation rule introduces constraints that render the mining process more precise.

Having mined the (acronym, expansion) pair becomes $R_1$, the formation rule $E_1$, and the pattern $P_i$, the process 200 stores this information in the database 80 (FIG. 2), and sets i=i+1, as illustrated by block or step 230. The process 200 then inquires at block or step 235 if a steady state has been reached. The steady state is said to be reached when all the documents are repeatedly investigated and no new acronyms, patterns, or formation rules are learned or, alternatively, a threshold time or another resource is reached. If the steady state is not reached, then the routine comprised of blocks or steps 210, 215, 220, 225, 230, and 235 is repeated. If on the other hand the steady state is reached, the process 200 is terminated at block or step 240.

The following example will be considered for added clarity. Presume that all the entries, i.e., the (acronym, expansion) pairs $R_{i-1}$, the formation rules $E_{i-1}$, and the patterns $P_{i-1}$, in Table 1 above have been identified by the process 200, and stored in the database 80, and that document $d_i$ provides the following acronym-expansion entry:

"DCD/DOCUMENT CONTENT DESCRIPTION".

The goal of the automatic mining system 10 is to identify and learn the new (acronym, expansion) pair $R_i$, the formation rule $E_i$, and the pattern $P_i$.

The formation rule identifier 100 (FIG. 2) considers the (acronym, expansion) pairs $R_{i-1}$ stored in the database 80 and extracts the formation rule $e_i$, which in this example is similar to the seed formation rule $e_0$. The acronym-expansion pair identifier 105 does not recognize any pattern in the database 80 that matches the pattern $p_i$ of the new (acronym, expansion) pair $r_i$, namely: acronym/Expansion. As a result, the acronym-expansion pair identifier 105 does not identify the new (acronym, expansion) pair $r_i$. The pattern identifier 110 recognizes the pattern $p_i$ of the new (acronym, expansion) pair $r_i$, and sends its findings comprised of the new pattern $r_i$ and the formation rule $e_i$ to the database 80, without recognizing the new (acronym, expansion) pair $r_i$.

Upon revisiting the same document, di, or another document that contains the (acronym, expansion) pair $r_i$ (DCD, DOCUMENT CONTENT DESCRIPTION), the automatic mining system 10 is capable to identify the (acronym, expansion) pair $r_i$ since it already has the pattern $r_i$ stored in the database 80. The pattern $p_i$ will be treated as a previously recognized pattern $p_{i-1}$. The mining process 200 (FIG. 3) is repeated, and in particular, the acronym-expansion pair identifier 105, knowing the pattern $P_{i-1}$, can now recognize the (acronym, expansion) pair $r_i$.

It is to be understood that the specific embodiments of the invention that have been described are merely illustrative of certain application of the principles of the present invention. Numerous modifications may be made to automatic mining system and associated methods described herein without departing from the spirit and scope of the present invention. Moreover, while the present invention is described for illustration purpose only in relation to the WWW, it should be clear that the invention is applicable as well to databases and other tables with indexed entries.

What is claimed is:

1. A system for automatically and iteratively mining acronyms and expansion in a document $d_i$ through patterns of occurrences and formation rules, comprising:

a database for storing previously identified acronym-expansion pairs $R_{i-1}$, patterns $P_{i-1}$, and formation rules $E_{i-1}$;

a formation rule identifier that uses the acronym-expansion pairs $R_{i-1}$ for deriving a formation rule $E_i$;

an acronym-expansion pair identifier that uses the document $d_i$ and the patterns $P_{i-1}$ for deriving an acronym-expansion pair $R_i$;

a pattern identifier that uses the document $d_i$, the derived formation rule $E_i$, the derived (acronym, expansion) pairs $R_i$, and the patterns $P_{i-1}$, for deriving a pattern $P_i$;

wherein the pattern $P_{i-1}$ defines a format in which the acronym and the expansion occur in the document $d_i$; and wherein the pattern $P_{i-1}$ is a tuple which is expressed in the following format:

(acronym_prefix, acronym_suffix, expansion_prefix, formation_rule, expansion_suffix), where the acronym_prefix and the acronym_suffix are surrounding characters of the acronym, and the expansion_prefix and the expansion_suffix are surrounding characters of the expansion.

2. A system for automatically and iteratively mining acronyms and expansion in a document $d_i$ through patterns of occurrences and formation rules, comprising:

a database for storing previously identified acronym-expansion pairs $R_{i-1}$, patterns $P_{i-1}$, and formation rules $E_{i-1}$;

a formation rule identifier that uses the acronym-expansion pairs $R_{i-1}$ for deriving a formation rule $E_i$;

an acronym-expansion pair identifier that uses the document $d_i$ and the patterns $P_{i-1}$, for deriving an acronym-expansion pair $R_i$;

a pattern identifier that uses the document $d_i$, the derived formation rule $E_i$, the derived acronym-expansion pairs $R_i$, and the patterns $P_{i-1}$, for deriving a pattern $P_i$;

wherein the pattern $P_{i-1}$ defines a format in which the acronym and the expansion occur in the document $d_i$; and wherein the pattern $P_{i-1}$ includes a set of individual patterns $p_n$ and is expressed as follows:

$$P_{i-1} = P_{i-2} + P'_{i-1},$$

where $P_{i-2}$ is a set of patterns that have been identified by the pattern identifier during an $(i-2)^{th}$ iteration, and $P'_{i-1}$ is a set of patterns that have been recently identified by the pattern identifier during an $(i-1)^{th}$ iteration.

3. A system for automatically and iteratively mining acronyms and expansion in a document $d_i$ through patterns of occurrences and formation rules, comprising:

a database for storing previously identified acronym-expansion pairs $R_{i-1}$, patterns $P_{i-1}$, and formation rules $E_i$;

a formation rule identifier that uses the (acronym-expansion) pairs $R_{i-1}$ for deriving a formation rule $E_i$;

an acronym-expansion pair identifier that uses the document $d_i$ and the patterns $P_{i-1}$ for deriving an (acronym-expansion) pair $R_i$;

a pattern identifier that uses the document $d_i$, the derived formation rule $E_i$, the derived (acronym-expansion) pairs $R_i$, and the patterns $P_{i-1}$, for deriving a pattern $P_i$;

wherein the pattern $P_{i-1}$ defines a format in which the acronym and the expansion occur in the document $d_i$; and wherein the acronym-expansion formation rule $E_{i-1}$ defines a format in which the acronym is associated with the expansion.

4. A system for automatically and iteratively mining acronyms and expansion in a document $d_i$ through patterns of occurrences and formation rules, comprising:

a database for storing previously identified (acronym-expansion) pairs $R_{i-1}$, patterns $P_{i-1}$, and formation rules $E_{i-1}$;

a formation rule identifier that uses the (acronym-expansion) pairs $R_{i-1}$ for deriving a formation rule $E_i$;

an acronym-expansion pair identifier that uses the document $d_i$ and the patterns $P_{i-1}$ for deriving an (acronym-expansion) pair $R_i$;

a pattern identifier that uses the document $d_i$, the derived formation rule $E_i$, the derived (acronym expansion) pairs $R_i$, and the patterns $P_{i-1}$, for deriving a pattern $P_i$;

wherein the pattern $P_{i-1}$ defines a format in which the acronym and the expansion occur in the document $d_i$; and wherein the formation rule $E_{i-1}$ includes asset of individual formation rules $e_n$ and is expressed as follows:

$$E_{i-1}=E_{i-2}+E'_{i-1},$$

where $E_{i-2}$ is a set of formation rules that have been identified by the formation rule identifier during an $(i-2)^{th}$ iteration, and $E'_{i-1}$ is a set of formation rules that have been recently identified by the formation rule identifier during an $(i-1)^{th}$ iteration.

5. The system according to claim 4, wherein each individual formation rule $e_n$ includes a sequence of replacement rules that are interspersed with an intermediate.

6. The system according to claim 5, wherein the intermediate includes a string of characters between words in the expansion that are not a part of the acronym.

7. The system according to claim 6, wherein a replacement rule is a tuple expressed as: (substring_beginPosition, substring_endPosition, replacee, replacer), where the substring_beginPosition is the position of a leading character of the expansion to be placed in the acronym, the substring_endPosition is the position of an ending character of the expansion to be placed in the acronym, the replacee is a substring to be replaced by another substring referred to as the replacer, if any, in the acronym.

8. A computer program product for automatically and iteratively mining acronyms and expansion in a document $d_i$ through patterns of occurrences and formation rules, comprising:

a database for storing previously identified (acronym-expansion) pairs $R_{i-1}$, patterns $P_{i-1}$, and formation rules $E_{i-1}$;

a formation rule identifier that uses the (acronym-expansion) pairs $R_{i-1}$ for deriving a formation rule $E_i$;

an acronym-expansion pair identifier that uses the document $d_i$ and the patterns $P_{i-1}$ for deriving an (acronym-expansion) pair $R_i$;

a pattern identifier that uses the document $d_i$, the derived formation rule $E_i$, the derived (acronym-expansion) pairs $R_i$, and the patterns $P_{i-1}$, for deriving a pattern $P_i$;

wherein the pattern $P_{i-1}$ defines a format in which the acronym and the expansion occur in document $d_i$;

wherein the pattern $P_{i-1}$ is a tuple which is expressed in the following format:

(acronym_prefix, acronym_suffix, expansion_prefix, formation_rule, expansion_suffix), where the acronym_prefix and the acronym_suffix are surrounding characters of the acronym, and the expansion_prefix and the expansion_suffix are surrounding characters of the expansion; and wherein the pattern $P_{i-1}$ includes a set of individual patterns $p_n$ and is expressed as follows:

$$P_{i-1}=P_{i-2}+P'_{i-1},$$

where $P_{i-2}$ is a set of patterns that have been identified by the pattern identifier during an $(i-2)^{th}$ iteration, and $P'_{i-1}$ is a set of patterns that have been recently identified by the pattern identifier during an $(i-1)^{th}$ iteration.

9. The computer program product according to claim 8, wherein the database stores the derived formation rule $E_i$, (acronym-expansion) pair $R_i$, and pattern $P_i$.

10. A computer program product for automatically and iteratively mining acronyms and expansion in a document $d_i$ through patterns of occurrences and formation rules, comprising:

a database for storing previously identified (acronym-expansion) pairs $R_{i-1}$, patterns $P_{i-1}$, and formation rules $E_{i-1}$;

a formation rule identifier that uses the (acronym-expansion) pairs $R_{i-1}$ for deriving a formation rule $E_i$;

an acronym-expansion pair identifier that uses the document $d_i$ and the patterns $P_{i-1}$ for deriving an (acronym-expansion) pair $R_i$;

a pattern identifier that uses the document $d_i$, the derived formation rule $E_i$, the derived (acronym-expansion) pairs $R_i$, and the patterns $P_{i-1}$ for deriving a pattern $P_i$;

wherein the acronym-expansion formation rule $E_{i-1}$ defines the format in which the acronym is associated with the expansion; and wherein the formation rule $E_{i-1}$ includes a set of individual formation rules $e_n$ and is expressed as follows:

$$E_{i-1}=E_{i-2}+E'_{i-1},$$

where $E_{i-2}$ is a set of formation rules that have been identified by the formation rule identifier during an $(i-2)^{th}$ iteration, and $E'_{i-1}$ is a set of formation rules that have been recently identified by the formation rule identifier during an $(i-1)^{th}$ iteration.

11. The computer program product according to claim 10, wherein each individual formation rule $e_n$ includes a sequence of replacement rules that are interspersed with an intermediate;

wherein the intermediate includes a string of characters between words in the expansion that are not a part of the acronym; and wherein a replacement rule is a tuple, expressed as: (substring_beginPosition, substring_endPosition, replacee, replacer), where the substring_beginPosition is the position of a leading character of the expansion to be placed in the acronym, the substring_endPosition is the position of an ending character of the expansion to be placed in the acronym, the replacee is a substring to be replaced by another substring referred to as the replacer, if any, in the acronym.

12. A method for automatically and iteratively mining acronyms and expansion in a document $d_i$ through patterns of occurrences and formation rules, comprising:

storing previously identified (acronym-expansion) pairs $R_{i-1}$, patterns $P_{i-1}$, and formation rules $E_{i-1}$;

using the (acronym-expansion) pairs $R_{i-1}$ for deriving a formation rule $E_i$;

using the document $d_i$ and the patterns $P_{i-1}$ for deriving an (acronym-expansion) pair $R_i$;

using the document $d_i$, the derived formation rule $E_i$, the derived (acronym-expansion) pairs $R_i$, and the patterns $P_{i-1}$, for deriving a pattern $P_i$;

further including defining the pattern $P_{i-1}$ by a format in which the acronym and the expansion occur in the document $d_i$; and wherein defining the pattern $P_{i-1}$ includes expressing the pattern $P_{i-1}$ by a tuple in the following format: (acronym_prefix, acronym_suffix, expansion_prefix, formation_rule, expansion_suffix), where the acronym_prefix and the acronym_suffix are surrounding characters of the acronym, and the expansion_prefix and the expansion_suffix are surrounding characters of the expansion.

13. The method according to claim 12, further including storing the derived formation rule $E_i$, (acronym-expansion) pair $R_i$, and pattern $P_i$.

14. The method according to claim 12, further including defining the acronym-expansion formation rule $E_{i-1}$ as a format in which the acronym is associated with the expansion.

15. The method according to claim 14, wherein the formation rule $E_{i-1}$ includes a set of individual formation rules $e_n$ and is expressed as follows:

$$E_{i-1}=E_{i-2}+E'_{i-1},$$

where $E_{i-2}$ is a set of formation rules that have been identified by the formation rule identifier during an $(i-2)^{th}$ iteration, and $E'_{i-1}$ is a set of formation rules that have been recently identified by the formation rule identifier during an $(i-1)^{th}$ iteration.

16. The method according to claim 15, wherein each individual formation rule $e_n$ includes a sequence of replacement rules that are interspersed with an intermediate.

17. The method according to claim 16, wherein the intermediate includes a string of characters between words in the expansion that are not a part of the acronym.

18. The method according to claim 17, wherein a replacement rule is a tuple expressed as: (substring_beginPosition, substring_endPosition, replacee, replacer), where the substring_beginPosition is the position of a leading character of the expansion to be placed in the acronym, the substring_endPosition is the position of an ending character of the expansion to be placed in the acronym, the replacee is a substring to be replaced by another substring referred to as the replacer, if any, in the acronym.

* * * * *